Patented Sept. 7, 1948

2,448,530

UNITED STATES PATENT OFFICE 2,448,530

MODIFIED SILICONE COMPOSITIONS

Henry F. Jones, Pittsfield, Mass., assignor to General Electric Company, a corporation of New York No Drawing. Application November 30, 1945, Serial No. 632,085

17 Claims. (Cl. 260—46.5)

This invention relates to modified silicone compositions. More particularly the invention is concerned with compositions comprising "a dimethyl silicone" gum or plastic solid in curable or cured state and, as a modifier of said gum, a small amount of a substance selected from the class consisting of mercury and compounds of mercury. Method features also are embraced by the scope of the present invention; for instance, the method which comprises incorporating a small amount of mercury or a mercury compound (e. g., oxides of mercury, for instance, mercurous oxide, mercuric oxide; salts of mercury, for instance, mercurous chromate, mercuric chromate, mercurous benzoate, mercuric benzoate, etc.) into a curable (e. g., heat-curable) composition comprising "a dimethyl silicone" gum capable of being cured or vulcanized, and curing the resulting composition, e. g., under heat or under heat and pressure.

The silicone gums or gum compositions which are modified in accordance with the present invention to obtain improved products are plastic, somewhat elastic, non-brittle solids. They are curable (vulcanizable) or potentially curable compositions, especially those which have incorporated therein a small amount (e. g., from about 0.1 to about 5 or 6 per cent, more particularly from about 1 to 3 per cent, by weight of the gum) of a peroxide, more particularly an organic or an inorganic peroxide, e. g., benzoyl peroxide, caprylyl peroxide, urea peroxide, tertiary-butyl hydroperoxide, lauroyl peroxide, tertiary-butyl perbenzoate (the use of this vulcanizing agent is more particularly disclosed and claimed in the copending application of James M. Marsden, Serial No. 763,445, filed July 24, 1947, and assigned to the same assignee as the present invention), dibenzaldehyde peroxide, lead peroxide, etc. I prefer to use an organic peroxide, and more particularly an organic peroxide which is miscible with the dimethyl silicone gum. By "a dimethyl silicone" gum as used generally herein and in the appended claims is meant such a gum or gum-like composition obtained from a silicone in which all or almost all of the silicon atoms of the silicone are each attached to two methyl radicals, e. g., one in which the methyl-to-silicon ratio is an average of from about 1.94 to 2.0 methyl groups per silicon atom, more particularly an average of from about 1.98 to 2.0 methyl groups per silicon atom. This methyl-to-silicon ratio of the silicone ordinarily is not materially changed by conversion of the gum-forming silicone to a curable gum or upon curing of the latter to yield a cured or vulcanized gum or gum product. This cured material, which generally has greater elasticity and much higher tensile strength than the uncured gum, hereafter will sometimes be referred to, or will be embraced by, the term "elastomer."

Curable, more particularly heat-curable, and cured, specifically heat-cured, silicone gums which are embraced by the brief description in the preceding paragraph and methods of preparing the same are more fully described and are broadly claimed in the copending application of Maynard C. Agens, Serial No. 526,473, filed March 14, 1944. As taught in the Agens application, a dimethyl silicone gum can be produced from a non-gummy silicone having a methyl-to-silicon ratio averaging, for example, from about 1.98 to 2.0 methyl groups per silicon atom by treating the same with, for instance, ferric chloride hexahydrate, a mixture of ferric oxide and aluminum chloride, or chlorinated tricresyl phosphate. Stated alternatively the solid elastic products may be described as solid, elastic, curable methylpolysiloxanes containing an average of from 1.98 to 2.0 methyl groups per silicon atom, said solid methylpolysiloxane having been obtained by condensing a liquid consisting of polymeric dimethylsiloxane containing up to 2 mol per cent copolymerized monomethylsiloxane. The resulting gum may be compounded with fillers, etc., and molded, extruded or otherwise shaped, as by heating under pressure, to form products having physical characteristics, e. g., elasticity, compressibility, etc., similar to those of natural rubber and other, known synthetic rubbers.

A small amount of a peroxide, specifically benzoyl peroxide, may be incorporated into the silicone gum composition for the purpose of accelerating its cure as is more fully described and claimed in the copending application of James G. E. Wright and Curtis S. Oliver, Serial No. 526,472, filed March 14, 1944. The peroxide, e. g., benzoyl peroxide, also functions to yield cured products having better properties, for instance improved elasticity, tensile strength and tear resistance, than is obtained by curing a similar gum composition containing no peroxide.

Other silicone gums that may be modified in accordance with the present invention are those obtained by treating a liquid dimethyl silicone with sulfuric acid or chlorosulfonic acid as is more fully described and claimed in the copending application of James Marsden and George F. Roedel, Serial No. 598,913, filed June 11, 1945; those which contain monomethyl-, dimethyl- and trimethyl-substituted silicone, not over 5 per cent of the total number of silicon atoms being each directly connected to only one methyl radical, as is more fully described and claimed in the copending application of Robert H. Krieble and John R. Elliott, Serial No. 598,914, filed June 11, 1945; and those containing both methyl-substituted and vinyl-substituted silicon atoms of the silicone, from about 0.18 to 2.0 per cent of the silicon atoms being each directly connected to at least one vinyl group, as is more fully described and claimed in the copending application of James Marsden, Serial No. 598,912, filed June 11, 1945, now Patent No. 2,445,794.

All of these silicone gums and gum compositions described briefly above and more fully in, for instance, the aforementioned copending applications, all of which are assigned to the same assignee as the present invention, and silicone gums otherwise prepared from a dimethyl silicone wherein all or almost all of the silicon atoms are each attached directly to two methyl radicals, may be modified with a small amount of mercury or a mercury compound in practicing my invention thereby to obtain an improved, cured dimethyl silicone gum or elastomer. It is to be understood, therefore, that the expression "a dimethyl silicone gum" as used generally herein and in the appended claims in describing the material that is modified in accordance with the present invention includes all such silicone gums regardless of how they may have been prepared.

The present invention is based on my discovery that the incorporation of a small amount (e. g., an amount not exceeding about 5 or 6 per cent by weight of the gum) of mercury or a mercury compound, numerous examples of which have been given hereinbefore, into a dimethyl silicone gum or gum composition (especially those which contain a peroxide, preferably benzoyl peroxide, as a curing or vulcanizing agent) materially shortens the time required to cure the resulting composition, as by heating, and yields a cured gum or elastomer having improved properties. The elastomers comprising the cured dimethyl silicone gums of the present invention are particularly characterized by their improved compression set characteristics and greater thermal stability as compared with elastomers similarly made but having no mercury or mercury compound incorporated therein. Other properties, e. g., hardness, tensile strength and elongation, are much the same as those of cured gum compositions in which the curing aid consists of, for example, benzoyl peroxide or a combination of PbO and benzoyl peroxide.

The improvements obtained by practicing my invention can be realized by the addition of a small amount, e. g., from about 0.1 to about 5 per cent by weight of the gum, more particularly from about 0.5 to about 4 per cent, and preferably about 1 to 3 per cent, of mercury or a mercury compound, e. g., an oxide of mercury (mercurous oxide or mercuric oxide) to a dimethyl silicone gum or gum composition such as those hereinbefore described.

The improvements resulting from the incorporation of a small amount of my modifier of a dimethyl silicone gum or gum composition, which thereafter is cured, as by heating, to yield an improved elastomer, will be apparent from a consideration of the following series of comparative tests in which mercuric oxide (HgO) was substituted for the lead oxide (PbO) component of a composition prepared in accordance with the teachings in the copending application of James Marsden and George F. Roedel, Serial No. 549,128, filed August 11, 1944, now Patent No. 2,436,220, and assigned to the same assignee as the present invention. The designated percentages are by weight of the gum component. The gum employed in these tests was prepared by polymerizing a liquid dimethyl silicone by means of about one per cent, by weight thereof, of ferric chloride hexahydrate. The resulting gum was compounded with a filler, more particularly an inert filler, and specifically a silica filler. During the compounding operation the specified percentages of lead oxide, mercuric oxide and benzoyl peroxide were added. The gum compositions thereby produced were pressed for 20 minutes at 150° C., and thereafter were subjected to further heat treatment for the times and with the results given in Table I.

Table I

| Curing Agent | 15 hours at 200° C. | | 64 hours at 200° C. | |
|---|---|---|---|---|
| | Durometer Hardness | Per cent Compression Set | Durometer Hardness | Per cent Compression Set |
| A Compounds: | | | | |
| 1% PbO 2% BzO₂ | 55 | 62 | 61 | 38 |
| 1% HgO 2% BzO₂ | 54 | 17 | 60 | 8 |
| B Compounds: | | | | |
| 1% PbO 2% BzO₂ | 73 | 31 | | |
| 1% HgO 2% BzO₂ | 74 | 10 | | |

| | | | 40 hours at 200° C. | |
|---|---|---|---|---|
| C Compounds: | | | | |
| 1% PbO 2% BzO₂ | 64 | 14.5 | 68 | 11.3 |
| 1% HgO 2% BzO₂ | 60 | 6.0 | 64 | 5.4 |
| D Compounds: | | | | |
| 1% PbO 2% BzO₂ | 55 | 62.1 | 60 | 41.0 |
| 2% HgO 2% BzO₂ | 53 | 22.3 | 56 | 11.6 |
| E Compounds: | | | | |
| 1% PbO 3% BzO₂ | 86 | 65.6 | 90 | 50.0 |
| 3% HgO 3% BzO₂ | 86 | 33.1 | 88 | 27.7 |

The siliceous filler used in each of the compounds listed in the above table was diatomaceous earth in the ratio of, by weight, 1 part gum to 1 part filler with the exception of E compounds where 1.5 parts filler to 1 part gum was used. The diatomaceous earth employed in the A, C, D and E compounds was that known to the trade as Celite 505, while that used in the B compound was Celite analytical filter aid. The compression set characteristics, which are given in Table I and elsewhere herein as per cent compression set, were determined by a modification of A. S. T. M. D–395–40–T Revised Method B. Molded plugs of the compounded gums, which had been heat-treated for the times shown in the table, were compressed to 70 per cent of their original thickness between steel plates, were heated while under compression at 150° C. for 6 hours, and then were quickly cooled to room temperature. The pressure was released, and the thickness of the resulting plug measured 10 minutes thereafter. The figures given in the table show the compression set of the plugs as a result of the treatment. A 100 per cent compression set would indicate no recovery, while a zero compression set would mean that the plug had returned to its original thickness after release of the pressure.

The data given in Table I show that the modifier, specifically mercuric oxide, had little effect if any on the hardness of the resulting elastomer, although in all cases it did produce a new and unobvious result, namely, a substantial decrease in the permanent compression set characteristics of the cured gum composition. This result was quite surprising and unexpected and in no way could have been predicted. Furthermore, there was no material change in the tensile strength and elongation of the elastomer or cured gum composition. The action of mercury or a mercury compound, e. g., mercurous oxide, mercuric oxide, etc., in thus improving the properties of a dimethyl silicone gum or gum composition is apparently specific in nature, so that the cured product has a lower compression set than is otherwise obtainable by methods now known to the art.

Similar data are given in Table II with regard to other modified and unmodified silicone gum compositions.

Table II

| Curing Agent | 40 hours at 200° C. | | 64 hours at 200° C. | |
|---|---|---|---|---|
| | Durometer Hardness | Percent Compression Set | Durometer Hardness | Percent Compression Set |
| F Compounds: | | | | |
| 3% BzO₂ | 72 | 39.8 | 82 | 37.5 |
| 3% BzO₂ 3% Hg₂O | 76 | 16.7 | 79 | 14.0 |
| G Compounds: | | | | |
| 3% BzO₂ | | | 82 | 30.5 |
| 3% BzO₂ 3% HgO | 69 | 19.1 | 69 | 12.8 |
| H Compounds: | | | | |
| 3% BzO₂ 3% HgO | 88 | 22.8 | 89 | 25.0 |
| 3% BzO₂ 3% Hg (metal) | 75 | 17.4 | 81 | 16.6 |
| I Compounds: | | | | |
| 3% BzO₂ 3% HgO | 87 | 24.0 | 89 | 26.9 |
| 3% BzO₂ 3% Hg₂O | 90 | 38.5 | 92 | 34.9 |
| 3% BzO₂ 3% Hg | 85 | 31.8 | 87 | 27.0 |

In all of the compounds given in Table II the filler was diatomaceous earth (Celite 505). G compound contained equal parts by weight of gum and filler, F and H compounds contained, by weight, 150 parts filler to 100 parts gum, while I compounds contained, by weight, 175 parts filler to 100 parts gum.

Another unexpected and unobvious result flowing from my invention is the greater thermal stability of cured dimethyl silicone gums or gum compositions obtained by curing, as by heating, curable dimethyl silicone gums or gum compositions having incorporated therein a small amount of mercury or a mercury compound. This is shown by the loss in weight and resultant deterioration of the elastomer when subjected to long ageing at 200° C. Table III contains data which clearly illustrate this point.

Table III

| Curing Agent | Per Cent Weight Loss After Ageing at 200° C. for approximately— | | | |
|---|---|---|---|---|
| | 5 days | 20 days | 40 days | 60 days |
| J Compounds: | | | | |
| 2% BzO₂ | 1.80 | 5.60 | 10.30 | 14.40 |
| 2% BzO₂ 2% Hg₂O | 1.10 | 2.85 | 4.25 | 5.50 |
| 3% BzO₂ | 3.35 | 12.05 | 17.75 | |
| 3% BzO₂ 3% PbO | 10.85 | (¹) | | |
| 3% BzO₂ 3% Hg₂O | 1.28 | 3.50 | 5.60 | 7.30 |
| 3% BzO₂ 3% Hg | 1.00 | 1.75 | 2.60 | 3.40 |
| K Compounds: | | | | |
| 3% BzO₂ | 2.60 | 10.10 | 15.70 | 18.20 |
| 3% BzO₂ 3% HgO | 1.05 | 3.15 | 5.35 | 7.15 |

¹ Fine powder.

In obtaining the data given in Table III round plugs of dimethyl silicone gum composition, 1 and ⅛ inch in diameter and ½ inch thick, were used. The plugs were cured for 64 hours at 200° C. prior to the start of the ageing tests. The weight loss involved in the 64-hour cure period is neglected in the data shown. All gum compounds originally contained 150 parts of a siliceous filler, more particularly diatomaceous earth (Celite 505), to 100 parts of gum. The values for per cent loss are calculated upon the weight of the plug prior to the start of the ageing tests. Hence the per cent by weight of silicone gum lost by heating at 200° C. would be 2½ times the values given. It is quite obvious from the data that the addition of mercury or a mercury compound, specifically an oxide of mercury, gives greater thermal stability to the cured gum or elastomer.

It will be understood, of course, by those skilled in the art that my invention is not limited to a particular dimethyl silicone gum or to a particular filler. Examples of suitable fillers are silica, titanium dioxide, calcium silicate, silicon carbide, ferric oxide, chromic oxide, cadmium sulfide, asbestos and others such as are given in, for instance, the above-mentioned Agens application Serial No. 526,473 including, for example, whiting, lithopone, talc, etc. Other finely divided solid materials ordinarily employed as fillers for natural rubber and other known synthetic rubbers also may be employed.

The amount of filler may be varied considerably depending, for example, upon the particular filler employed, its particle size, and the purpose for which the finished product is to be used. Thus, filled gums may be produced containing, for instance, from about 20 to about 75 per cent by weight of the whole of filler material, the chosen percentage depending upon such factors as aforementioned. More particularly I have used successfully a filler, more particularly an inert filler, and specifically a silica, e. g., diatomaceous earth, in amounts varying from, by weight, about 75 to about 175 parts of such filler per 100 parts gum.

Illustrative examples of other peroxides that may be used, in addition to benzoyl peroxide and others such as mentioned hereinbefore, are acetyl peroxide, lauryl peroxide, stearyl peroxide, stearoyl peroxide, acetyl benzoyl peroxide, terpene peroxide (e. g., ascaridole), oleyl peroxide, secondary - butyl hydroperoxide, tertiary - amyl hydroperoxide, 1, hydroxycyclohexyl hydroperoxide-1, 1,1'-di-(hydroxycyclohexyl) peroxide-1,1', di-(tertiary-butyl perphthalate), di-(tertiary-butyl persuccinate), di-(tertiary-butyl peradipate), tertiary-butyl perfuroate, di-(methyl maleoyl) peroxide, etc.

Illustrative examples of other compounds of mercury that may be employed in addition to those mentioned in the first paragraph of this specification are mercurous and mercuric carbonates, mercurous and mercuric formates, mercurous and mercuric acetates, mercurous and mercuric oxalates, mercurous and mercuric tungstates, etc., the foregoing compounds of mercury being examples of mercury salts.

The products of this invention are useful in applications such as are given in the aforementioned copending applications, for instance as gaskets, tubing, electrical insulation (e. g., as conductor insulation, etc.), shock absorbers, etc. They are particularly suitable for use in such constructions as are disclosed and claimed in my copending application Serial No. 632,086, filed November 30, 1945, filed concurrently herewith and assigned to the same assignee as the present invention. Because of their resistance to heat they are valuable materials for use in applications where natural or other synthetic rubbers fail owing to the deleterious effect of heat. The elastomers produced by practicing my invention have the additional valuable property of retaining their flexibility at low temperatures, e. g., at temperatures as low as minus 60° C. The curable or cured gums or gum compositions of this invention may be compounded, if desired, with other gums or elastomers, specifically with natural rubber or with other synthetic gums or rubbers, to modify the properties of such gums or rubbers.

What I claim as new and desire to secure by Letters Patent of the United States is:

1. A curable composition comprising (1) a solid, elastic, curable methylpolysiloxane containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, (2) from 0.1 to 6 per cent, by weight, based on the weight of (1), of a substance selected from the class consisting of mercury, oxides of mercury and salts of mercury, and (3) a peroxide cure accelerator for (1).

2. A product comprising a cured, solid, elastic methylpolysiloxane containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, the said elastic methylpolysiloxane having incorporated therein prior to curing (1) from 0.1 to 6 per cent, by weight, based on the weight of the solid, elastic methylpolysiloxane, of a substance selected from the class consisting of mercury, oxides of mercury and salts of mercury, and (2) a peroxide cure accelerator for the aforementioned solid elastic methylpolysiloxane.

3. A heat-curable composition comprising a solid, elastic methylpolysiloxane containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, said solid, elastic methylpolysiloxane having incorporated therein (1) from 0.1 to 6 per cent, by weight, of a peroxide cure accelerator and (2) from 0.1 to 5 per cent, by weight, of mercury, each of the weights of (1) and (2) being based on the weight of the solid, elastic methylpolysiloxane.

4. A heat-curable, solid, elastic product comprising (1) a solid, elastic methylpolysiloxane containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, (2) from 0.1 to 5 per cent, by weight, based on the weight of (1), of a salt of mercury, and (3) from 0.1 to 6 per cent, by weight, of a peroxide cure accelerator, the weight of which is based on the weight of (1).

5. A heat-curable, elastic product comprising (1) a solid, elastic methylpolysiloxane containing an average of from 1.98 to 2.00 methyl groups per silicon atom, said solid methylpolysiloxane having been obtained by condensing a liquid consisting of polymeric dimethylsiloxane containing up to 2 mol per cent monomethylsiloxane, (2) from 0.1 to 5 per cent, by weight, based on the weight of (1), of an oxide of mercury, and (3) from 0.1 to 6 per cent, by weight, of a peroxide cure accelerator, the weight of which is based on the weight of (1).

6. A product comprising the heat-cured elastic product of claim 5.

7. A heat-curable, elastic, silicone product comprising (1) a solid, elastic methylpolysiloxane containing an average of from 1.98 to 2.00 methyl groups per silicon atom, said solid methylpolysiloxane having been obtained by condensing a liquid consisting of polymeric dimethylsiloxane containing up to 2 mol per cent monomethylsiloxane, (2) from 0.1 to 5 per cent, by weight, based on the weight of the solid, elastic methylpolysiloxane, of mercurous oxide, and (3) from 0.1 to 6 per cent, by weight, of a peroxide cure accelerator, the weight of which is based on the weight of (1).

8. An elastomer comprising the heat-cured elastic product of claim 7.

9. A curable composition comprising (1) a solid, elastic methylpolysiloxane containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, (2) from 0.1 to 6 per cent, by weight, benzoyl peroxide, and (3) from 0.1 to 6 per cent, by weight, of a substance selected from the class consisting of mercury, oxides of mercury, and salts of mercury, the weights of (2) and (3) being based on the weight of (1).

10. A heat-curable, elastic composition comprising (1) a solid, elastic methylpolysiloxane containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, (2) a filler, (3) from 0.1 to 6 per cent, by weight, benzoyl peroxide, and (4) from 0.1 to 5 per cent, by weight, of an oxide of mercury, the weights of (3) and (4) being based on the weight of (1).

11. A product comprising the heat-cured composition of claim 10.

12. A heat-curable, elastic composition comprising (1) a solid, elastic methylpolysiloxane containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, (2) from 0.1 to 6 per cent, by weight, benzoyl peroxide, and (3) from 0.1 to 5 per cent, by weight, of an oxide of mercury, the weights of (2) and (3) being based on the weight of (1).

13. A shaped article comprising the heat-cured composition of claim 12.

14. A curable, elastic product comprising (1) a solid, elastic methylpolysiloxane containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, (2) a filler of silica, (3) from 0.1 to 5 per cent, by weight, benzoyl peroxide, and (4) from 0.1 to 5 per cent, by weight, of an oxide of mercury, the percentages of components (3) and (4) being based on the weight of (1).

15. A product comprising the cured composition of claim 14.

16. A product comprising a synthetic elastomer obtained by curing a solid, elastic methylpolysiloxane containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, the said elastic methylpolysiloxane having incorporated therein for each 100 parts of said gum, (1) from 1 to 3 parts benzoyl peroxide, (2) from 1 to 3 parts mercurous oxide, and (3) from 75 to 175 parts silica, all parts being by weight, and the said elastomer having a lower compression than a similar elastomer containing no mercurous oxide.

17. The method which comprises (1) incorporating a peroxide cure accelerator and from 0.1 to 6 per cent, by weight, of a substance selected from the class consisting of mercury, oxides of mercury, and salts of mercury into a curable composition comprising a solid, elastic methylpolysiloxane containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, and (2) curing the resulting composition under the influence of heat.

HENRY F. JONES.

REFERENCES CITED

The following references are of record in the file of this patent:

UNITED STATES PATENTS

| Number | Name | Date |
| --- | --- | --- |
| 2,386,259 | Norton | Oct. 9, 1945 |
| 2,392,713 | Wright et al. | Jan. 8, 1946 |